(12) United States Patent
Umesh et al.

(10) Patent No.: US 8,098,664 B2
(45) Date of Patent: Jan. 17, 2012

(54) RETRANSMISSION-REQUEST TRANSMITTING METHOD AND RECEIVING SIDE APPARATUS

(75) Inventors: Anil Umesh, Yokohama (JP); Atsushi Harada, Kawasaki (JP)

(73) Assignee: NTT Docomo, Inc., Tokyo (JP)

( * ) Notice: Subject to any disclaimer, the term of this patent is extended or adjusted under 35 U.S.C. 154(b) by 165 days.

(21) Appl. No.: 12/532,718

(22) PCT Filed: Mar. 21, 2008

(86) PCT No.: PCT/JP2008/055332
§ 371 (c)(1),
(2), (4) Date: Nov. 16, 2009

(87) PCT Pub. No.: WO2008/123160
PCT Pub. Date: Oct. 16, 2008

(65) Prior Publication Data
US 2010/0135303 A1  Jun. 3, 2010

(30) Foreign Application Priority Data
Mar. 23, 2007 (JP) ............................... P2007-077978

(51) Int. Cl.
*H04L 12/28* (2006.01)
(52) U.S. Cl. .................... 370/394; 370/338; 714/748
(58) Field of Classification Search ................ 714/748
See application file for complete search history.

(56) References Cited

U.S. PATENT DOCUMENTS
| | | | | |
|---|---|---|---|---|
| 5,337,313 A * | 8/1994 | Buchholz et al. | ............. | 370/394 |
| 2005/0270996 A1 | 12/2005 | Yi et al. | | |
| 2005/0281232 A1 * | 12/2005 | Kim et al. | ............. | 370/335 |
| 2007/0042782 A1 * | 2/2007 | Lee et al. | ............. | 455/450 |
| 2008/0209297 A1 * | 8/2008 | Chandra et al. | ............. | 714/748 |

FOREIGN PATENT DOCUMENTS
| | | |
|---|---|---|
| JP | 2000-134263 A | 5/2000 |
| JP | 2001-36585 A | 2/2001 |
| WO | 2005/117317 A1 | 12/2005 |

OTHER PUBLICATIONS

International Search Report w/translation from PCT/JP2008/055332 dated Jun. 20, 2008 (4 pages).
Written Opinion from PCT/JP2008/055332 dated Jun. 10, 2008 (3 pages).
Siemens; "ARQ operation and HARQ"; 3GPP TSG RAN WG2#55, R2-062843; Seoul, South Korea; Oct. 9-13, 2006 (4 pages).

(Continued)

*Primary Examiner* — Duc C Ho
(74) *Attorney, Agent, or Firm* — Osha Liang LLP

(57) ABSTRACT

In a retransmission-request transmitting method, the receiving side apparatus activates a reordering timer, when receiving a first packet before receiving an unreceived packet with a sequence number smaller than a sequence number of the first packet; triggers transmission of a retransmission request for the unreceived packet, when having not received the unreceived packet by the time of expiration of the reordering timer activated in response to the receipt of the first packet; and stops and reactivates the reordering timer activated in response to the receipt of the first packet, when a value of the sequence number of the first packet falls out of a range of the receiving side window as a result of changing the upper limit value and the lower limit value in accordance with a sequence number of a second packet received from the transmitting side apparatus.

6 Claims, 14 Drawing Sheets

OTHER PUBLICATIONS

ASUSTeK; "Window based mechanism for HARQ stall avoidance"; 3GPP TSG RAN WG2#26, R2-020082; Sophia-Antipolis, France; Jan. 7-11, 2002 (6 pages).

Patent Abstracts of Japan; Publication No. 2000-134623 dated May 12, 2000; Matsushita Electric Ind. Co., Ltd. (1 page).

Patent Abstracts of Japan; Publication No. 2001-036585 dated Feb. 9, 2001; Telecommunication Advancement Organization of Japan (1 page).

* cited by examiner

FIG. 8

STATUS-PDU (NACK)

| 0 | 1 | 2 | 3 | 4 | 5 | 6 | 7 |
|---|---|---|---|---|---|---|---|
| Type | | | Control PDU Type | | | | Reserve |
| Selective NACK SN | | | | | | | |
| Selective NACK First Octet | | | | | | Reserve | |
| Selective NACK First Octet | | | | | | Reserve | |
| Selective NACK SN | | | | | | | |
| Selective NACK Last Octet | | | | | | Reserve | |
| Selective NACK Last Octet | | | | | | Reserve | |

RETRANSMISSION-REQUEST TRANSMITTING METHOD AND RECEIVING SIDE APPARATUS

TECHNICAL FIELD

The present invention relates to a retransmission-request transmitting method by which a receiving side apparatus triggers transmission of a retransmission request for a packet from a transmitting side apparatus. The present invention also relates to the receiving side apparatus.

BACKGROUND ART

The 3GPP, which is an organization that standardizes third generation mobile phone systems, has been making a study generically called LTE (Long Term Evolution), to achieve dramatic improvement in transmission speed and reduction in transmission delay in a radio access network (RAN). The 3GPP has been developing standard specifications for constituent techniques for such study.

As shown in FIG. 5, a radio access network (E-UTRAN: Evolved Universal Terrestrial RAN) in a mobile communication system employing the LTE scheme includes a mobile station UE (User Equipment) and a radio base station eNB (E-UTRAN Node B). The mobile station UE and the radio base station eNB communicate with each other through a radio link (RL).

Each of the mobile station UE and the radio base station eNB terminates an RLC (Radio Link Control) sublayer, a MAC (Medium Access Control) sublayer, and a physical (PHY) layer.

A transmitting side apparatus (the mobile station UE or the radio base station eNB) subjects transmission data to RLC processing, MAC processing, and PHY processing, in this order, and then transmits the data as a radio signal from a radio unit.

On the other hand, a receiving side apparatus (the mobile station UE or the radio base station eNB) extracts transmission data by subjecting the radio signal received at a radio unit to PHY processing, MAC processing, and RLC processing, in this order.

Here, the transmission data includes user data (U-plane data) generated by applications or the like used by the user; and control data (C-plane data), such as RRC (Radio Resource Control) signaling and NAS (Non Access Stratum) signaling, used for control of the mobile communication system.

Moreover, RLC retransmission control processing is performed between the RLC sublayer of the transmitting side apparatus and the RLC sublayer of the receiving side apparatus; and HARQ (Hybrid Automatic Repeat Request) retransmission control processing (MAC retransmission control processing) is performed between the MAC sublayer of the transmitting side apparatus and the MAC sublayer of the receiving side apparatus.

In a mobile communication system employing an IMT-2000 scheme, as shown in FIG. 1, the MAC sublayer of a receiving side apparatus performs reordering processing on RLC-PDUs received, and sends the RLC-PDUs to the RLC sublayer in order of the sequence numbers.

In contrast, in a mobile communication system employing the LTE scheme, as shown in FIG. 2, the MAC sublayer of a receiving side apparatus sends received RLC-PDUs to the RLC sublayer without performing the reordering processing on the RLC-PDUs.

Accordingly, in the mobile communication system employing the LTE scheme, as FIG. 3 shows, the RLC sublayer of the receiving side apparatus is configured to perform reordering processing on received RLC-PDUs as follows. Specifically, when receiving an RLC-PDU of sequence number #4 before receiving an RLC-PDU of sequence number #3, the RLC sublayer activates a reordering timer and waits for receipt of the RLC-PDU of sequence number #3 until the reordering timer expires.

DISCLOSURE OF THE INVENTION

However, in the mobile communication system employing the LTE scheme, as FIG. 4 shows, the RLC sublayer of the receiving side apparatus is configured to manage a receiving side window defining an upper limit value ("VR(MR)") and a lower limit value ("VR(R)") of a sequence number of a receivable packet, and to discard an RLC-PDU having a sequence number smaller than the lower limit value of the receiving side window, without receiving the RLC-PDU.

Further, the RLC sublayer of the receiving side apparatus is configured to update the upper limit value and the lower limit value of the receiving side window, in accordance with the sequence number of an RLC-PDU received from the RLC sublayer of a transmitting side apparatus.

Accordingly, there is a case where a value of the sequence number #3 falls out of the range of the receiving side window as a result of updating the upper limit value and the lower limit value of the receiving side window even before expiration of the reordering timer. In such a case, the following problem arises. Specifically, the RLC sublayer of the receiving side apparatus can no longer receive the RLC-PDU of sequence number #3, making it fruitless to wait for receipt of such RLC-PDU and to perform retransmission control processing on such RLC-PDU. There is also a problem that fruitless retransmission control processing is performed because the reordering timer continues operating even after the update of the upper limit value and the lower limit value of the receiving side window.

The present invention has been made in consideration of the above problems, and has an objective of providing a retransmission-request transmitting method and a receiving side apparatus by which waiting fruitlessly for receipt of an RLC-PDU and performing fruitless retransmission control processing on such RLC-PDU can be avoided in accordance with the update status of the upper limit value and the lower limit value of the receiving side window.

A first aspect of the present invention is summarized as a retransmission-request transmitting method in which a receiving side apparatus triggers transmission of a retransmission request for a packet from a transmitting side apparatus, the receiving side apparatus managing a receiving side window defining an upper limit value and a lower limit value of a sequence number of a receivable packet, the retransmission-request transmitting method including the steps of: activating, at the receiving side apparatus, a reordering timer, when receiving a first packet before receiving an unreceived packet with a sequence number within the receiving side window and smaller than a sequence number of the first packet; and triggering, at the receiving side apparatus, transmission of a retransmission request for the unreceived packet, when having not received the unreceived packet by the time of expiration of the reordering timer activated in response to the receipt of the first packet; wherein the receiving side apparatus stops the reordering timer activated in response to the receipt of the first packet, when a value of the sequence number of the first packet falls out of a range of the receiving side window as a result of updating the upper limit value and the lower limit value in accordance with a sequence number of a second packet received from the transmitting side apparatus.

In the first aspect, the receiving side apparatus can reactivate the reordering timer, when the reordering timer activated in response to the receipt of the first packet has been stopped as a result of updating the upper limit value and the lower limit value in accordance with the sequence number of the second packet received from the transmitting side apparatus; and when there is an unreceived packet with a sequence number having a value within the receiving side window.

In the first aspect, the receiving side apparatus can trigger transmission of a retransmission request for the unreceived packet, when having not received an unreceived packet of a sequence number smaller than the sequence number of the second packet by the time of expiration of the reordering timer activated in response to receipt of the second packet.

A second aspect of the present invention is summarized as a receiving side apparatus configured to trigger transmission of a retransmission request for a packet from a transmitting side apparatus, the receiving side apparatus being configured to: manage a receiving side window defining an upper limit value and a lower limit value of a sequence number of a receivable packet; activate a reordering timer, when having received a first packet before receiving an unreceived packet with a sequence number within the receiving side window and smaller than a sequence number of the first packet; trigger transmission of a retransmission request for the unreceived packet when having not received the unreceived packet by the time of expiration of the reordering timer activated in response to receipt of the first packet; and stop the reordering timer activated in response to the receipt of the first packet, when a value of the sequence number of the first packet falls out of a range of the receiving side window as a result of updating the upper limit value and the lower limit value in accordance with a sequence number of a second packet received from the transmitting side apparatus.

In the second aspect, the receiving side apparatus can be configured to reactivate the reordering timer, when the reordering timer activated in response to the receipt of the first packet has been stopped as a result of updating the upper limit value and the lower limit value in accordance with the sequence number of the second packet received from the transmitting side apparatus; and when there is an unreceived packet of a sequence number having a value within the receiving side window.

In the second aspect, the receiving side apparatus can be configured to trigger transmission of a retransmission request for the unreceived packet, when an unreceived packet of a sequence number smaller than the sequence number of the second packet has not been received by the time of expiration of the reordering timer activated in response to receipt of the second packet.

As described above, the present invention can provide a retransmission-request transmitting method and a receiving side apparatus by which waiting fruitlessly for receipt of an RLC-PDU and performing fruitless retransmission control processing on such RLC-PDU can be avoided in accordance with the update status of the upper limit value and the lower limit value of the receiving side window.

DETAILED DESCRIPTION OF THE DRAWINGS

FIG. 8 is a diagram showing a format example of a STATUS-PDU generated by the RLC sublayer of the mobile station and the radio base station according to the first embodiment of the present invention.

BEST MODES FOR CARRYING OUT THE INVENTION

Configuration of Mobile Communication System According to First Embodiment of Present Invention With reference to FIGS. 5 to 9, a configuration of a mobile communication system according to a first embodiment of the present invention will be described.

Figure 1:
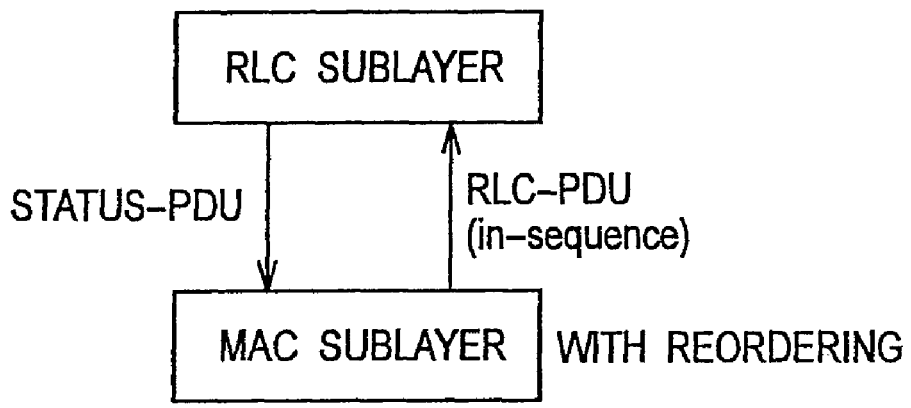
FIG. 1 is a diagram illustrating an operation of a conventional mobile communication system.
Figure 2:
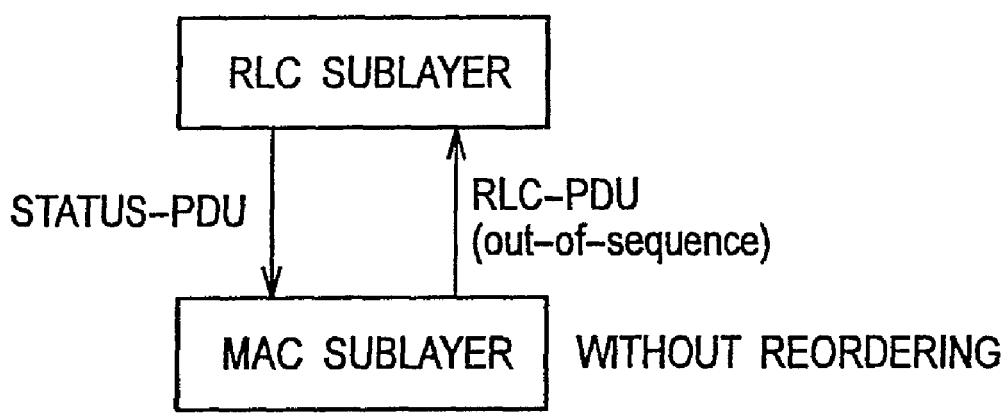
FIG. 2 is a diagram illustrating an operation of a conventional mobile communication system.
Figure 3:
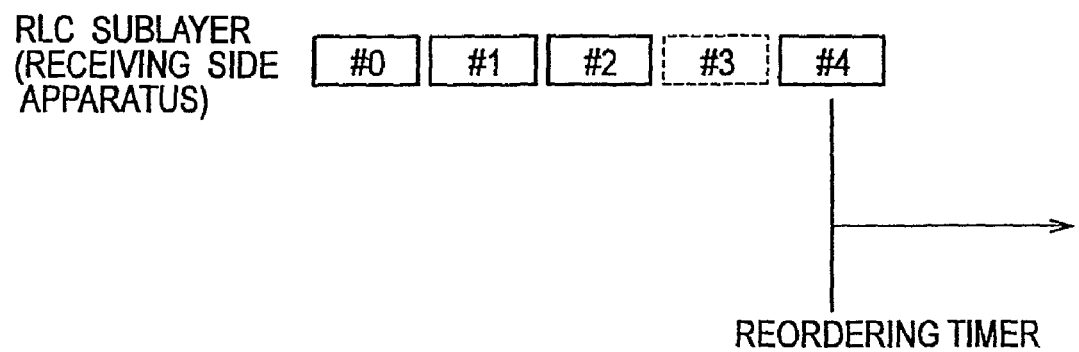
FIG. 3 is a diagram illustrating an operation of a conventional mobile communication system.
Figure 4:
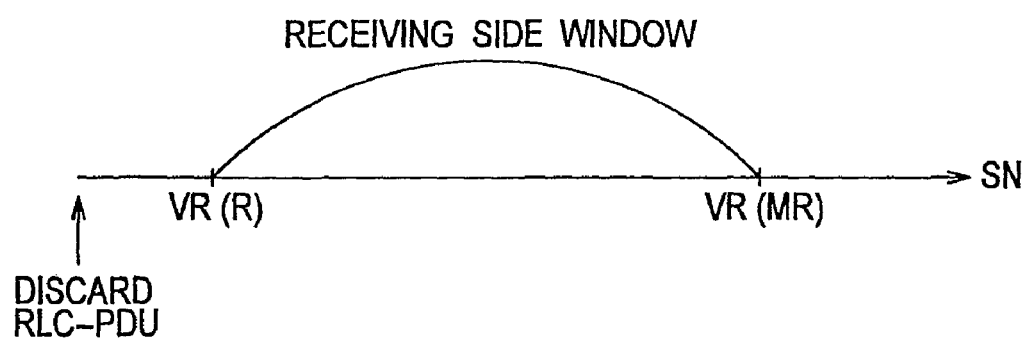
FIG. 4 is a diagram illustrating an operation of a conventional mobile communication system.
Figure 5:
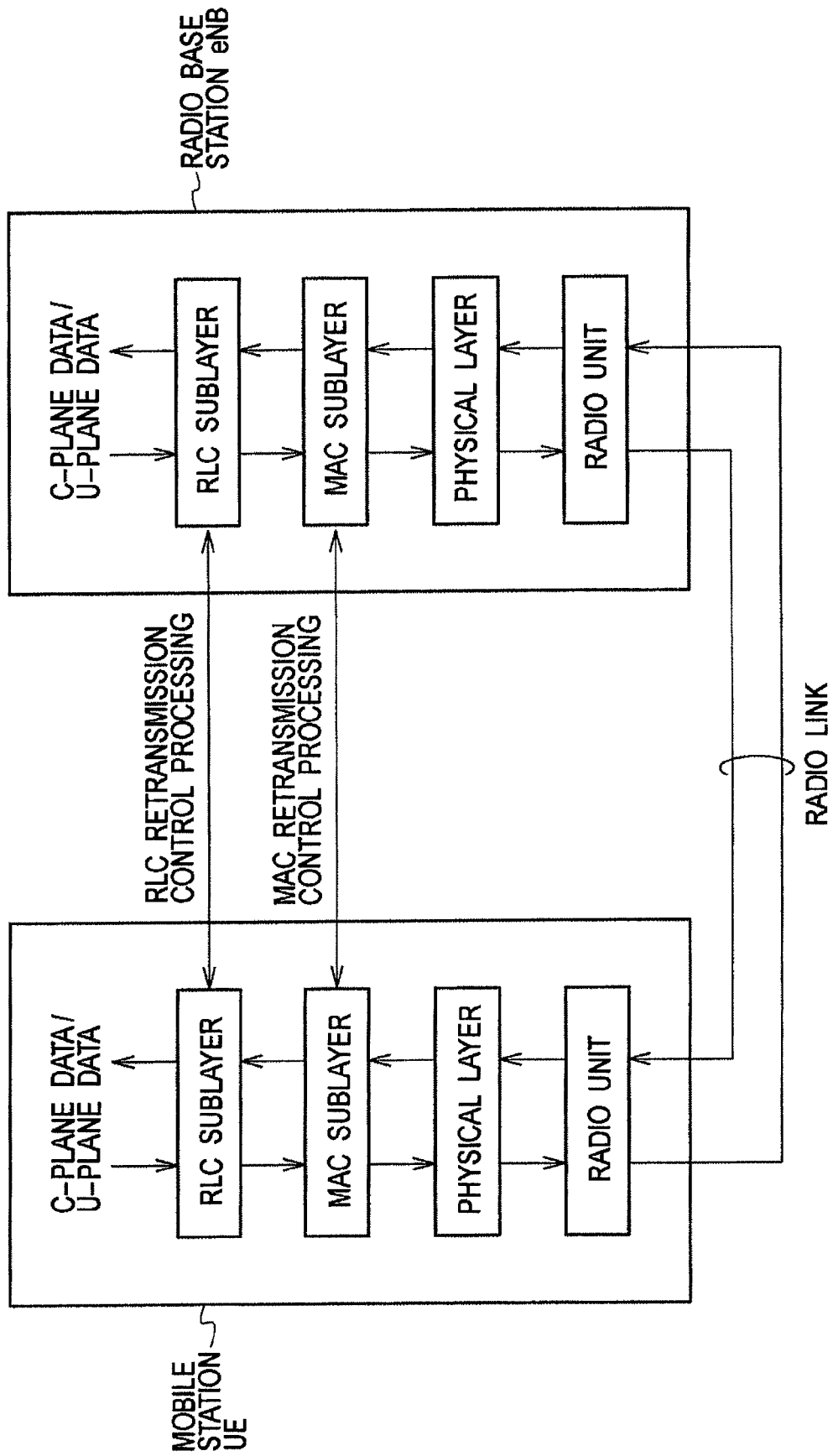
FIG. 5 is a diagram showing a protocol-layer configuration, in a radio access network, of a mobile communication system according to a first embodiment of the present invention.

As FIG. 5 shows, a mobile communication system including an LTE/SAE (System Architecture Evolution) architecture, the 3GPP standardization of which is underway, is described as an example in the embodiment. However, the present invention is not limited to such a mobile communication system, and is also applicable to a mobile communication system including a different architecture.

Figure 6:
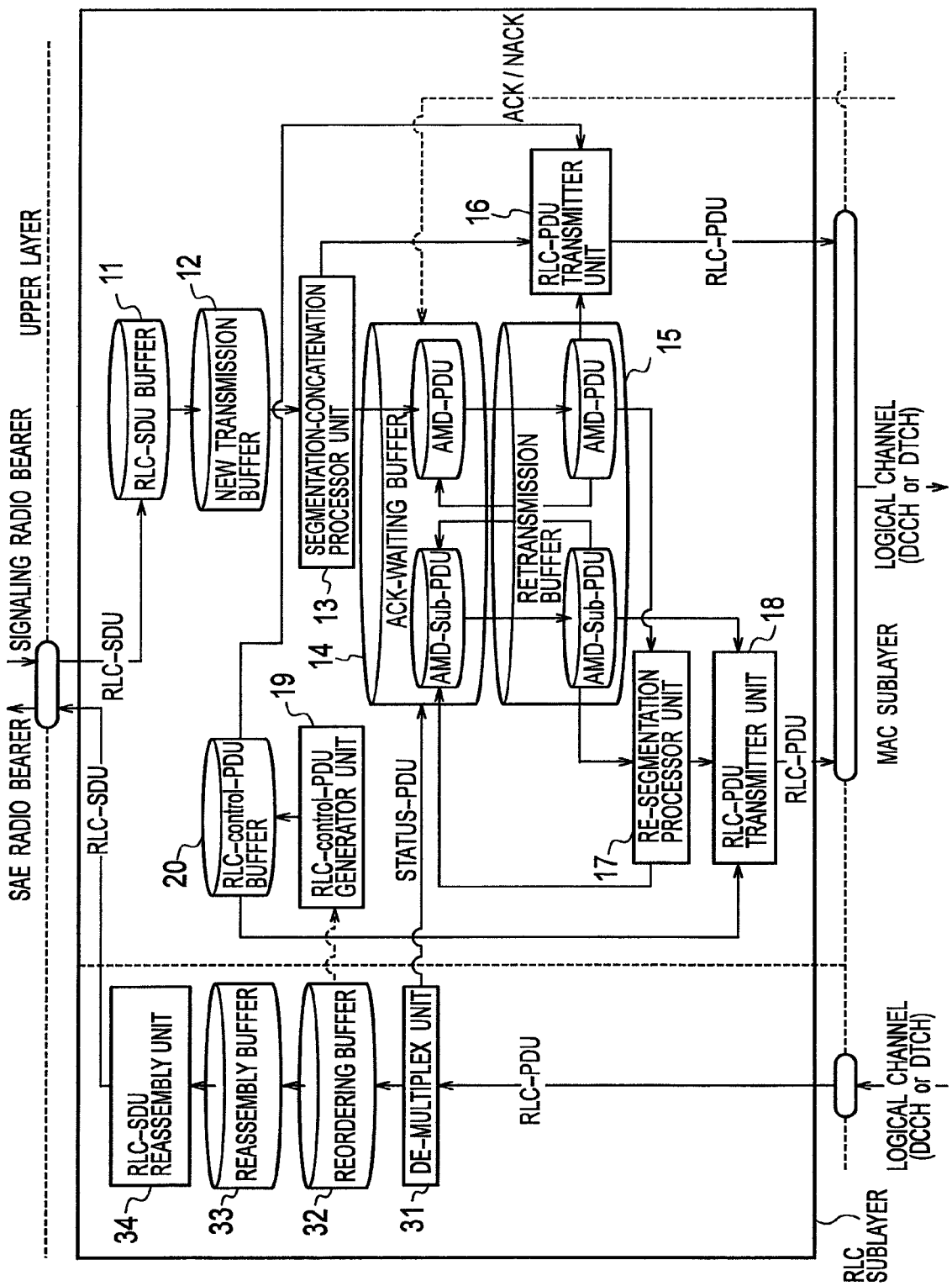
FIG. 6 is a functional diagram of an RLC sublayer of a mobile station and a radio base station according to the first embodiment of the present invention.

Referring to FIG. 6, a description will be given of a functional configuration of an RLC sublayer in an Acknowledge Mode (AM) (simply called an RLC sublayer below).

Note that the functions (modules), shown in FIG. 6, constituting the RLC sublayer may be partially or entirely implemented by hardware or software on an IC chip. For instance, on an IC chip, functions (modules) constituting a MAC sublayer and a physical layer, which generally require simple and high-speed processing, may be implemented by hardware, and functions (modules) constituting the RLC sublayer, which generally require complicated processing, may be implemented by software. Moreover, the functions (modules) constituting the physical layer, the functions (modules) constituting the MAC sublayer, and the functions (modules) constituting the RLC sublayer may be implemented on the same IC chip, or on different IC chips.

Referring to FIG. 6, an example is shown below of the configuration of the RLC sublayer in the mobile communication system according to the embodiment.

As FIG. 6 shows, the RLC sublayer includes an RLC-SDU buffer 11, a new transmission buffer 12, a segmentation-concatenation processor unit 13, an ACK-waiting buffer 14, a retransmission buffer 15, an RLC-PDU transmitter unit 16, a re-segmentation processor unit 17, an RLC-PDU transmitter unit 18, an RLC-control-PDU generator unit 19, an RLC-control-PDU buffer 20, a de-multiplex unit 31, a reordering buffer 32, a reassembly buffer 33, and an RLC-SDU reassembly unit 34.

The RLC-SDU buffer 11 is configured to store an RLC-SDU received from an upper layer.

The new transmission buffer 12 is configured to make a copy of the RLC-SDU stored in the RLC-SDU buffer 11 and to store the copy.

When notified by the MAC sublayer of a data transmission occasion, the segmentation-concatenation processor unit 13 is configured to generate an RLC-PDU, by subjecting (all or part of) the RLC-SDUs stored in the new transmission buffer 12 to segmentation processing or to concatenation processing. Specifically, the segmentation-concatenation processor unit 13 is configured to generate the RLC-PDU whose size is the maximum within an allowable transmission data amount which is also notified from the MAC sublayer. Here, the RLC-PDU is an RLC-PDU used in the RLC sublayer in the AM.

In addition, the segmentation-concatenation processor unit 13 is configured to not only transmit the generated RLC-PDU to the RLC-PDU transmitter 16 but also store the generated RLC-PDU in the ACK-waiting buffer 14.

The ACK-waiting buffer 14 is configured to store the RLC-PDU from the segmentation-concatenation processor unit 13, an RLC-PDU or RLC-Sub-PDU from the retransmission buffer 15, and an RLC-Sub-PDU from the re-segmentation processor unit 17.

The ACK-waiting buffer 14 is configured to determine whether the stored RLC-PDU or RLC-Sub-PDU needs to be retransmitted or not, and to deliver the RLC-PDU or RLC-Sub-PDU to the retransmission buffer 15 when determined that retransmission is necessary.

Here, for example, the ACK-waiting buffer 14 determines that the stored RLC-PDU or RLC-Sub-PDU needs to be retransmitted, when, for example, having received a STATUS-PDU (NACK) from the RLC sublayer of a receiving side apparatus and a NACK from the MAC sublayer of the receiving side apparatus.

FIG. 8 shows an example format of the STATUS-PDU (NACK) used in the mobile communication system according to the embodiment.

As shown in FIG. 8, the STATUS-PDU (NACK) has a "Type" field, a "Control PDU Type" field, a "Selective NACK SN" field, a "Selective NACK First Octet" field, and a "Selective NACK Last Octet" field.

Here, the payload part of the STATUS-PDU (NACK) may have two or more sets of the "Selective NACK SN" field, the "Selective NACK First Octet" field, and the "Selective NACK Last Octet" field.

The "Control PDU Type" field indicates a type of the RLC-control-PDU. A conceivable type of the RLC-control-PDU is, for example, a STATUS-PDU(ACK), the STATUS-PDU (NACK), or the like.

The "Selective NACK SN" field indicates a sequence number of an RLC-PDU within a receiving side window of the RLC sublayer of the receiving side apparatus, which is determined to require RLC retransmission.

The "Selective NACK First Octet" field indicates from which byte (octet) in the RLC-PDU specified by the "Selected NACK SN" field the retransmission is necessary.

The "Selective NACK Last Octet" field indicates until which byte (octet) in the RLC-PDU specified by the "Selected NACK SN" field the retransmission is necessary.

The retransmission buffer 15 is configured to store the RLC-PDU and RLC-Sub-PDU received from the ACK-waiting buffer 14.

The RLC-PDU transmitter unit 16 is configured to send the RLC-PDU received from the segmentation-concatenation processor unit 13 and the RLC-PDU stored in the retransmission buffer 15, to the MAC sublayer, when notified by the MAC sublayer of a data transmission occasion.

Here, the RLC-PDU transmitter unit 16 may be configured to send a RLC-PDU-piggybacked-control-PDU generated by adding, to the RLC-PDU to be transmitted, an RLC-control-PDU (such as the STATUS-PDU) stored in the RLC-control-PDU buffer 20.

The re-segmentation processor unit 17 is configured to segment a single RLC-PDU or RLC-Sub-PDU stored in the retransmission buffer 15, and to thereby generate multiple RLC-Sub-PDUs. Here, the re-segmentation processor unit 17 is configured to perform the segmentation in accordance with the status of radio link communication, or specifically, in accordance with the allowable transmission data amount also notified by the MAC sublayer. In other words, the re-segmentation processor unit 17 is configured to perform re-segmentation processing on the RLC-PDU or RLC-Sub-PDU stored in the retransmission buffer 15.

Figure 7:
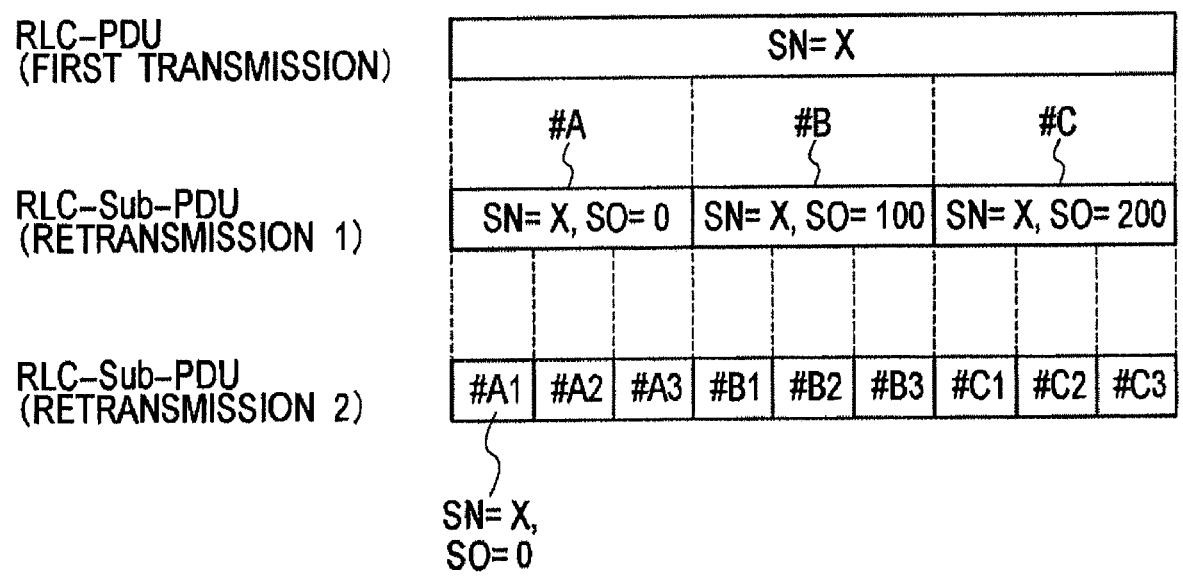
FIG. 7 is a diagram illustrating re-division processing performed in the RLC sublayer of the mobile station and the radio base station according to the first embodiment of the present invention.

In the example shown in FIG. 7, in the first retransmission, the re-segmentation processor unit 17 segments an RLC-PDU (SN=X) into three RLC-Sub-PDUs #A to #C. Then, in the second retransmission, the re-division processor unit 17 divides the RLC-Sub-PDUs #A to #C into three RLC-Sub-PDUs #A1 to #A3, #B1 to #B3, and #C1 to #C3, respectively.

The RLC-PDU transmitter unit 18 is configured to send the RLC-Sub-PDUs subjected to the re-segmentation processing by the re-segmentation processor unit 17, to the MAC sublayer, when notified by the MAC sublayer of a data transmission occasion.

Here, the RLC-PDU transmitter unit 18 may be configured to send an RLC-Sub-PDU-piggybacked-control-PDU generated by adding, to the RLC-Sub-PDU to be transmitted, an RLC-control-PDU (such as the STATUS-PDU) stored in the RLC-control-PDU buffer 20.

The RLC-control-PDU generator unit 19 is configured to generate a STATUS-PDU (ACK/NACK) in response to notification from the reordering buffer 32.

The RLC-control-PDU buffer 20 is configured to receive and store the RLC-control-PDU generated by the RLC-control-PDU generator unit 19.

The de-multiplex unit 31 is configured to extract a STATUS-PDU from an RLC-PDU received from the MAC sublayer and to forward the extracted STATUS-PDU to the ACK-waiting buffer 14. Additionally, the de-multiplex unit 31 is configured to extract an RLC-PDU and an RLC-Sub-PDU from the RLC-PDU received from the MAC sublayer and to forward the extracted RLC-PDU and RLC-Sub-PDU to the reordering buffer 32.

Note that the MAC sublayer is configured to send the RLC-PDU to the RLC sublayer without performing reordering processing, as described above.

The reordering buffer 32 is configured to perform the reordering processing on the RLC-PDU stored therein.

Specifically, the reordering buffer 32 stores RLC-PDUs (in-sequence) stored in order of the sequence numbers, in the reassembly buffer 33.

On the other hand, the reordering buffer 32 is configured to handle RLC-PDUs (out-of-sequence) stored not in order of the sequence numbers as follows. Specifically, by use of a reordering timer, the reordering buffer 32 is configured to determine a necessity of a retransmission request for an RLC-PDU. When determined that a retransmission request for an unreceived RLC-PDU is necessary, the reordering buffer 32 is configured to notify the RLC-control-PDU generator unit 19 of that determination.

Figure 9:
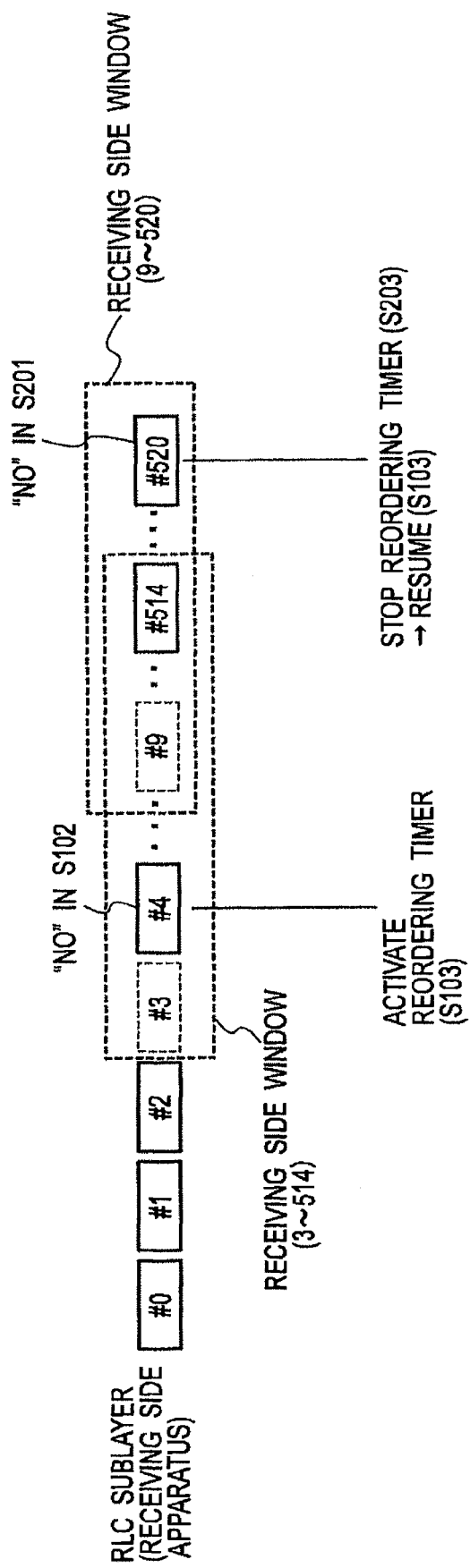
FIG. 9 is a diagram illustrating an operation of the RLC sublayer of the mobile station and the radio base station according to the first embodiment of the present invention.

Specifically, as shown in FIG. 9, the reordering buffer 32 is configured to activate the reordering timer when having received an RLC-PDU of sequence number #4 (first packet) before receiving an RLC-PDU of sequence number #3 (an unreceived packet with a sequence number smaller than the sequence number of the first packet).

Then, the reordering buffer 32 instructs the RLC-control-PDU generator unit 19 to trigger transmission of a retransmission request for the RLC-PDU with sequence number #3 (unreceived packet), when having not received the RLC-PDU of sequence number #3 (unreceived packet) which is within a receiving side window by the time of expiration of the reordering timer activated in response to the receipt of the RLC-PDU of sequence number #4 (first packet).

Moreover, the reordering buffer 32 is configured to manage the receiving side window defining an upper-limit value ("VR (MR)") and a lower-limit value ("VR(R)") of a sequence number of a receivable packet.

Figure 10:
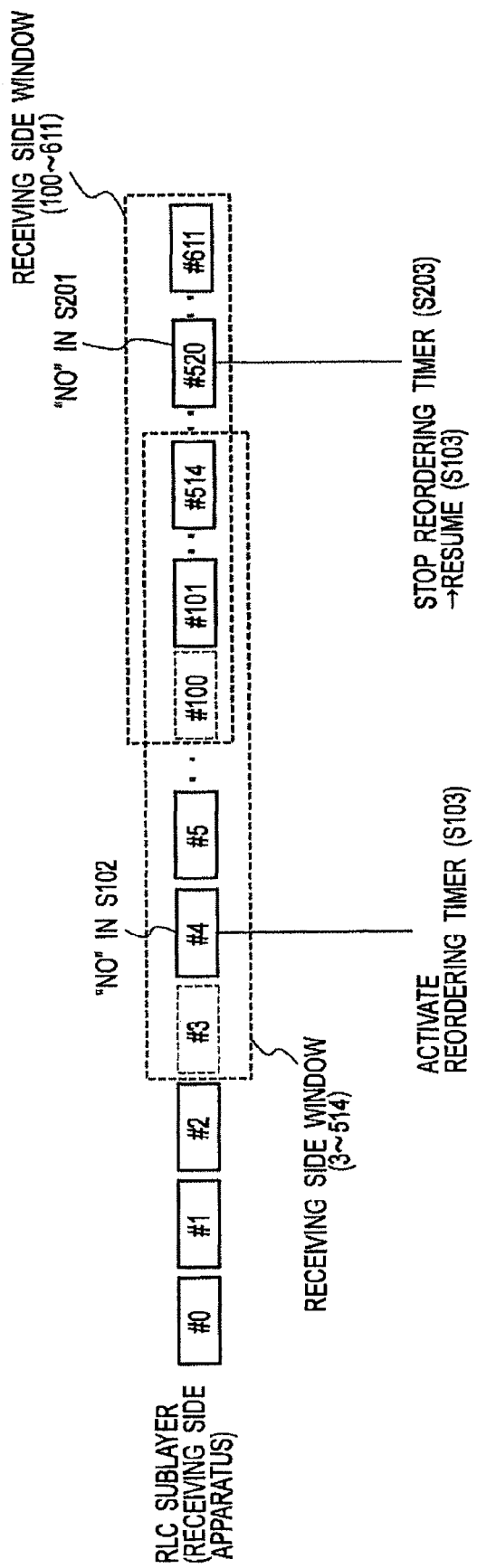
FIG. 10 is a diagram illustrating an operation of the RLC sublayer of the mobile station and the radio base station according to the first embodiment of the present invention.
Figure 11:
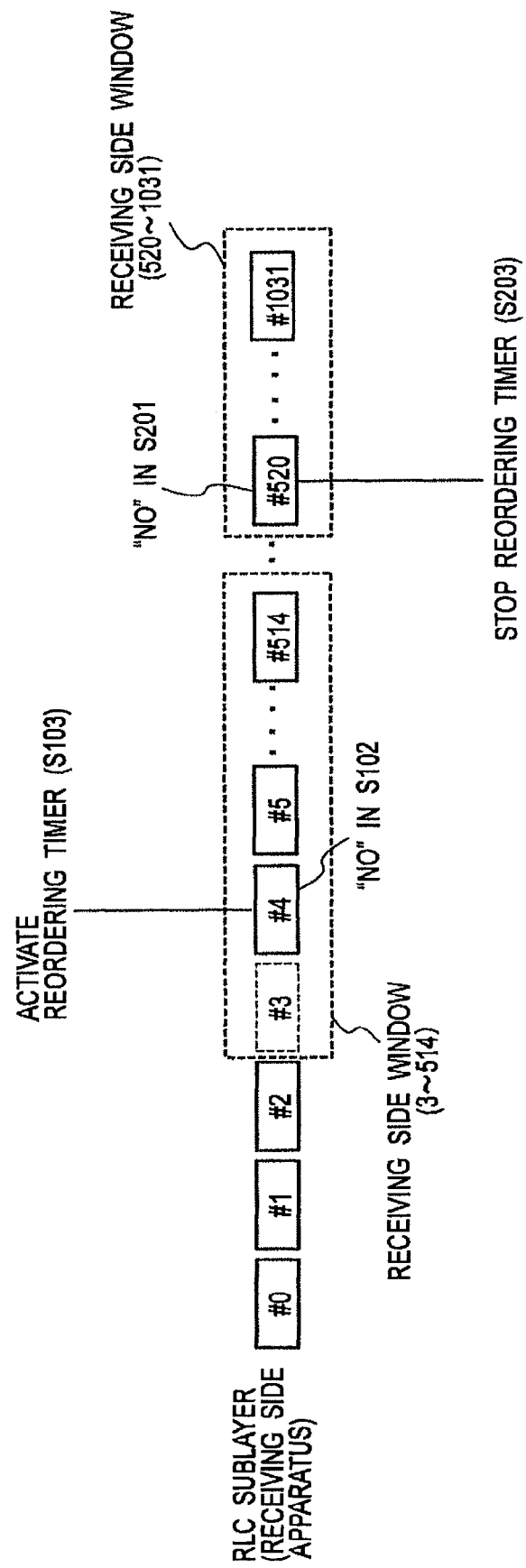
FIG. 11 is a diagram illustrating an operation of the RLC sublayer of the mobile station and the radio base station according to the first embodiment of the present invention.

Note that the receiving side windows in the respective examples in FIGS. 9 to 11 each have a "Window Size" of "512", and the "VR(MR)" and the "VR(R)" are "514" and "3", respectively, when the RLC-PDU of sequence number #4 is received.

Figure 13:
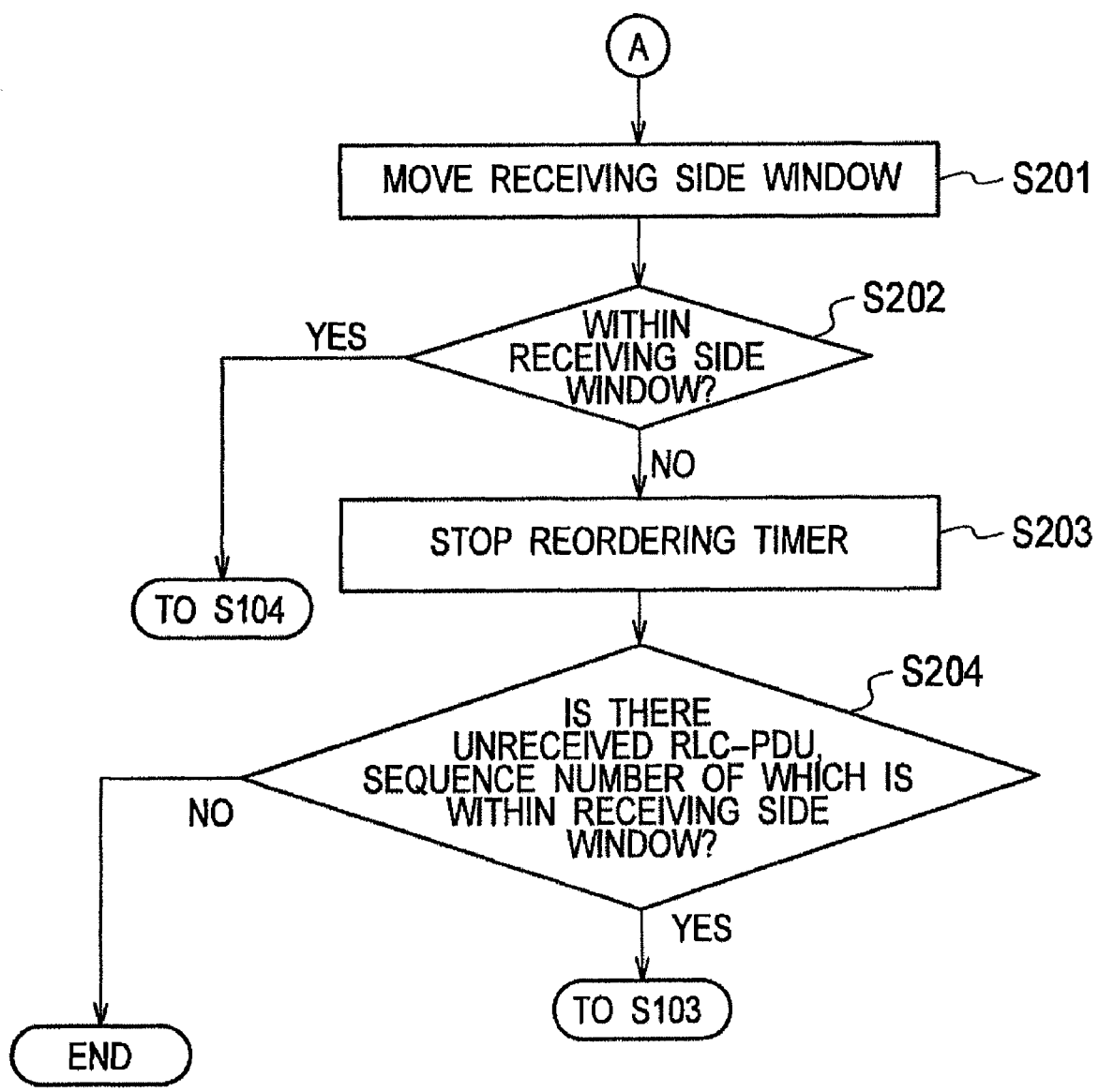
FIG. 13 is a flowchart illustrating an operation of the RLC sublayer of the mobile station and the radio base station according to the first embodiment of the present invention.

First, referring to the example in FIG. 9, the reordering buffer 32 is configured to stop the reordering timer activated in response to receipt of the RLC-PDU with sequence number #4, when the sequence number #4 falls out of the value range of the receiving side window as a result of updating the upper limit value and the lower limit value of the receiving side window ("VR(MR)"=520, "VR(R)"=9) in accordance with the reception of an RLC-PDU (second packet) with sequence number #520 from the RLC sublayer of a transmitting side apparatus (S203 to be described later in connection with FIG. 13).

Figure 12:
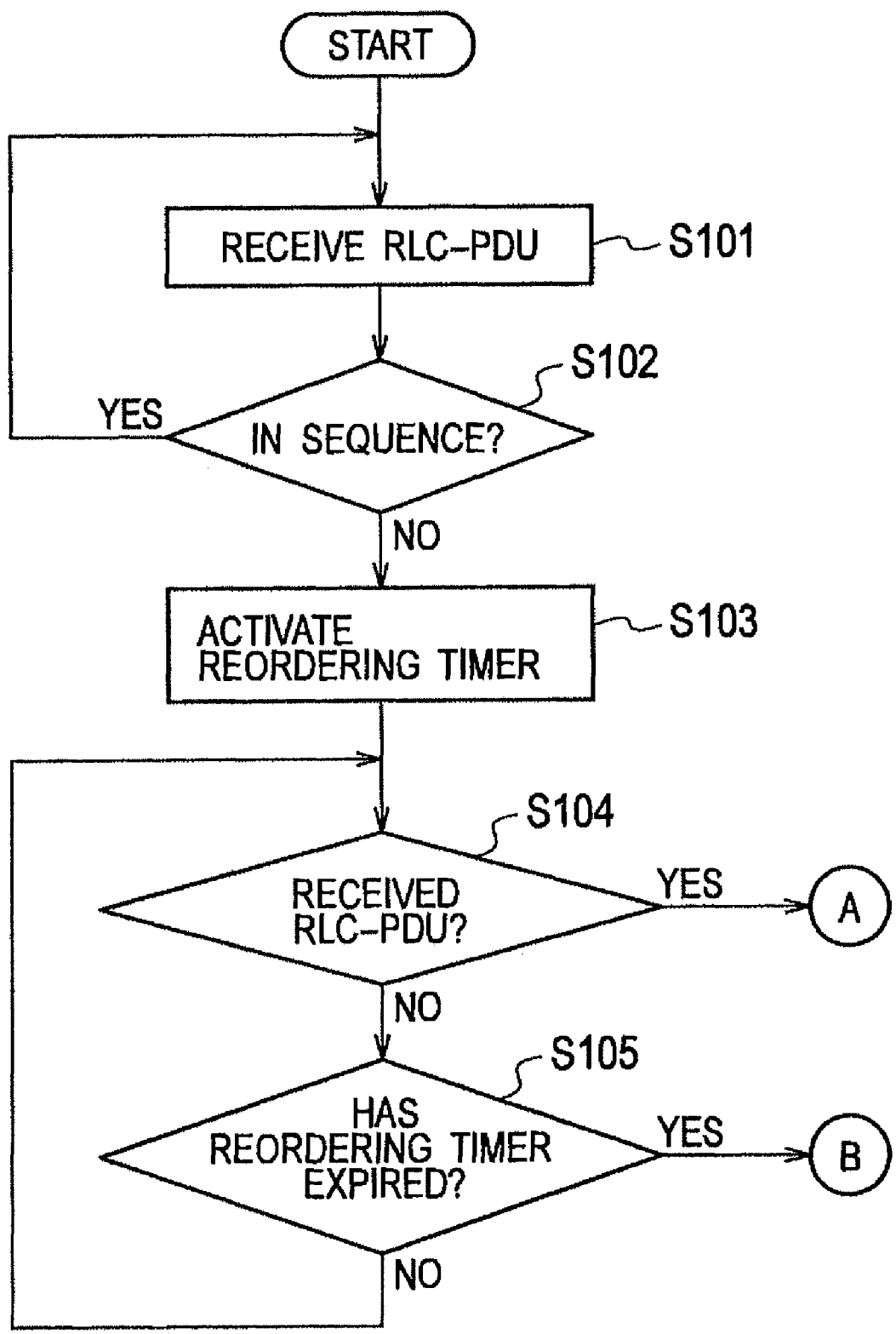
FIG. 12 is a flowchart illustrating an operation of the RLC sublayer of the mobile station and the radio base station according to the first embodiment of the present invention.

Then, in the example in FIG. 9, the reordering buffer 32 is configured to reactivate the reordering timer, if there is an unreceived RLC-PDU (sequence number #9) with a sequence number within values (9 to 520) of the receiving side window in the case where the reordering timer has been activated in response to the receipt of the RLC-PDU with sequence number #4 and then stopped as a result of updating the upper limit value and the lower limit value of the receiving side window ("VR(MR)"=520, "VR(R)"=9) in accordance with reception of the RLC-PDU (second packet) with the sequence number #520 from the RLC sublayer of the transmitting side apparatus (S103 to be described later in connection to FIG. 12).

Thereafter, in the example in FIG. 9, when having not received an unreceived packet with a sequence number within the receiving side window and smaller than the sequence number #520 (sequence number of the second packet) by the time of expiration of the reordering timer activated in response to the receipt of the RLC-PDU with sequence number #520 (second packet), the reordering buffer 32 may instruct the RLC-control-PDU generator unit 19 so as to trigger transmission of a retransmission request for the unreceived packet.

Second, referring to the example in FIG. 10, the reordering buffer 32 is configured to stop the reordering timer activated in response to the receipt of the RLC-PDU with sequence number #4, when the sequence number #4 falls out of the value range of the receiving side window as a result of updating the upper limit value and the lower limit value of the receiving side window in accordance with the reception of the RLC-PDU (second packet) with sequence number #520 from the RLC sublayer of a transmitting side apparatus ("VR (MR)"= 611, "VR(R)"=100) (S203 to be described later in connection with FIG. 13).

Then, in the example in FIG. 10, the reordering buffer 32 is configured to reactivate the reordering timer, if there is an unreceived RLC-PDU (sequence number #100) with a sequence number within values (100 to 611) of the receiving side window in the case where the reordering timer has been activated in response to the receipt of the RLC-PDU with sequence number #4 and then stopped as a result of updating the upper limit value and the lower limit value of the receiving side window ("VR(MR)"=611, "VR(R)"=100) in accordance with the reception of the RLC-PDU (second packet) with sequence number #520 from the RLC sublayer of the transmitting side apparatus (S103 to be described later in connection to FIG. 12).

Here, in the example in FIG. 10, the lower limit value "VR(R)" is updated not to "9" but to "100", because the reordering buffer 32 has already received the RLC-PDUs with sequence numbers #9 to #99 when receiving the RLC-PDU with sequence number #520 (second packet) from the RLC sublayer of the transmitting side apparatus.

Thereafter, in the example in FIG. 10, when having not received an unreceived packet with a sequence number within the receiving side window and smaller than the sequence number #520 (sequence number of the second packet) by the time of expiration of the reordering timer activated in response to the receipt of the RLC-PDU with sequence number #520 (second packet), the reordering buffer 32 may instruct the RLC-control-PDU generator unit 19 so as to trigger transmission of a retransmission request for the unreceived packet.

Third, referring to the example in FIG. 11, the reordering buffer 32 is configured to stop the reordering timer activated in response to the receipt of the RLC-PDU with sequence number #4, when the sequence number #4 falls out of the value range of the receiving side window as a result of updating the upper limit value and the lower limit value of the receiving side window ("VR (MR)"=1031, "VR (R)"=520) in accordance with the reception of an RLC-PDU (second packet) with sequence number #520 from the RLC sublayer of a transmitting side apparatus (S203 to be described later in connection with FIG. 13).

Then, in the example in FIG. 11, the reordering buffer 32 is configured not to reactivate but to keep stopped the reordering timer, if there is no unreceived RLC-PDU with a sequence number within values (520 to 1031) of the receiving side window in the case where the reordering timer has been activated in response to the receipt of the RLC-PDU with sequence number #4 and then stopped as a result of updating the upper limit value and the lower limit value of the receiving side window in accordance with the reception of an RLC-PDU (second packet) with sequence number #520 from the RLC sublayer of the transmitting side apparatus ("VR (MR)"=1031, "VR(R)"=520).

Here, in the example in FIG. 11, the lower limit value "VR(R)" is updated not to "9" but to "520", because the reordering buffer 32 has already received the RLC-PDUs with sequence numbers #9 to #519 when receiving the RLC-PDU with sequence number #520 (second packet) from the RLC sublayer of the transmitting side apparatus.

The reordering buffer 32 is configured to reassemble an RLC-PDU when being able to reassemble the RLC-PDU from RLC-Sub-PDUs stored therein.

The RLC-SDU reassembly unit 34 is configured to reassemble an RLC-SDU and to send the RLC-SDU to the upper layer in order of the sequence numbers, when being able to reassemble the RLC-SDU from the RLC-PDU stored in the reassembly buffer 33.

(Operation of Mobile Communication System According to First Embodiment of Present Invention)

Figure 14:
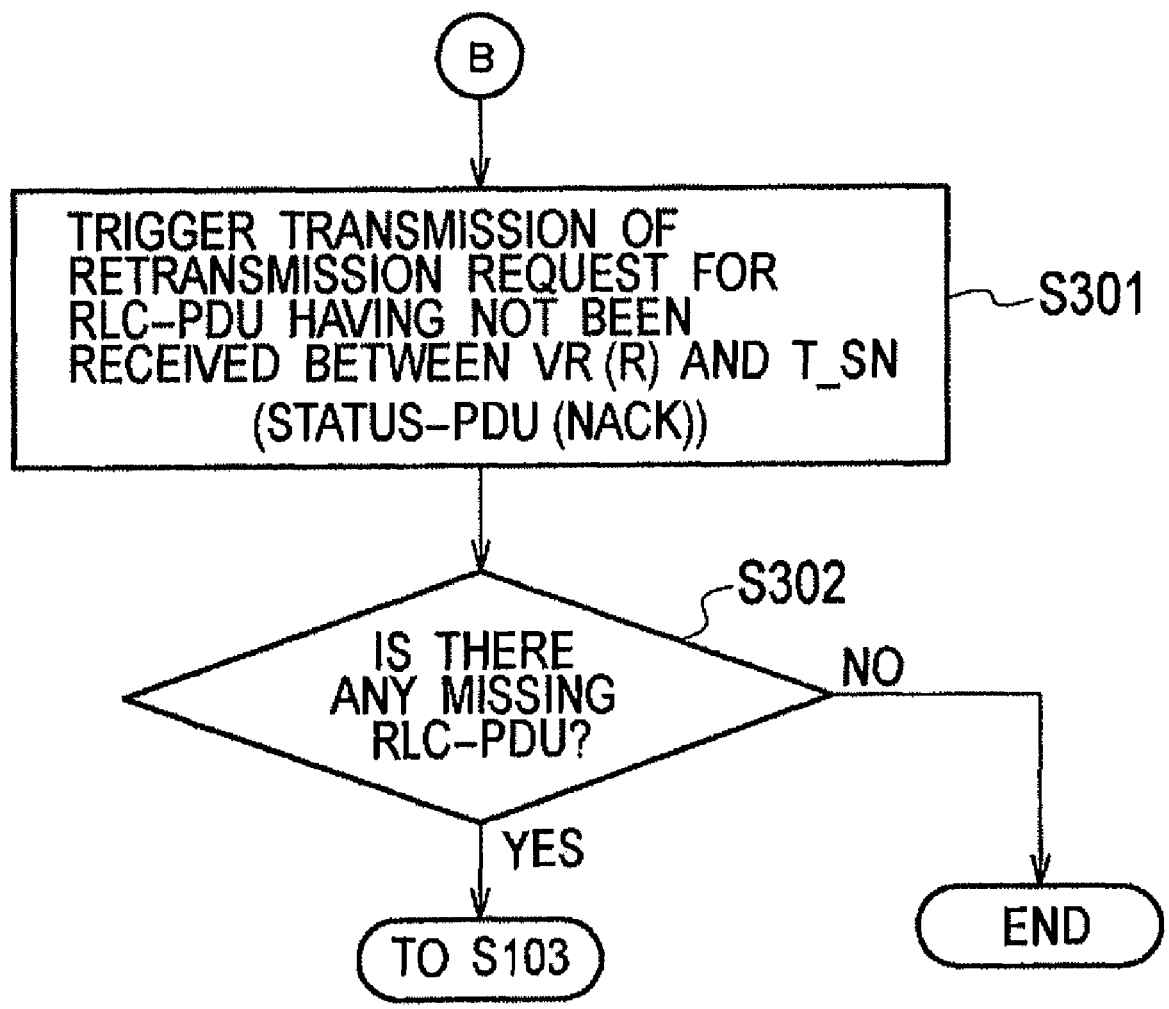
FIG. 14 is a flowchart illustrating an operation of the RLC sublayer of the mobile station and the radio base station according to the first embodiment of the present invention.

With reference to FIGS. 12 to 14, a description will be given of an operation of the receiving side apparatus in the mobile communication system according to the first embodiment of the present invention.

As FIG. 12 shows, in Step S101, the RLC sublayer of the receiving side apparatus receives an RLC-PDU. Then, in Step S102, the RLC sublayer determines whether or not the RLC-PDU has been received in correct order of the sequence numbers.

When determined that the RLC-PDU has not been received in correct order of the sequence numbers (e.g., the RLC-PDU of sequence number #4 in FIG. 9), in Step S103, the RLC sublayer of the receiving side apparatus activates the reordering timer, triggered by the receipt of the RLC-PDU of sequence number #4.

In Step S104, the RLC sublayer of the receiving side apparatus determines whether or not an RLC-PDU has been received during the activation of the reordering timer.

The operation goes to an operation shown in FIG. 13 when it is determined that an RLC-PDU has been received. When it is determined that no RLC-PDU has been received, in Step S105, the RLC sublayer of the receiving side apparatus determines whether or not the reordering timer has expired or not.

The operation goes to an operation shown in FIG. 14 when it is determined that the reordering timer has expired, or returns to Step S104 when it is determined that the reordering timer has not expired yet.

As shown in FIG. 13, in Step S201, if necessary, the RLC sublayer of the receiving side apparatus updates the upper limit value and the lower limit value of the receiving side window, namely, moves the receiving side window, based on the sequence number of the RLC-PDU received in Step S104.

In Step S202, the RLC sublayer of the receiving side apparatus determines whether or not a value of the sequence number of the RLC-PDU (e.g., the RLC-PDU of sequence number #4 in FIG. 9) having triggered the activation of the reordering timer in Step S103 is within the range of the current receiving side window.

The operation returns to Step S104 shown in FIG. 12 when it is determined that a value of the sequence number is within the range of the receiving side window, or goes to Step S203 when it is determined that the value of the sequence number is not within the range of the receiving side window (e.g., the RLC-PDU of sequence number #520 in FIG. 9).

In Step S203, the RLC sublayer of the receiving side apparatus stops the reordering timer currently being activated.

In Step S204, the RLC sublayer of the receiving side apparatus determines whether or not there is any unreceived RLC-PDU the sequence of which is within the receiving side window.

The operation terminates when there is no such RLC-PDU, or returns to Step S103 shown in FIG. 12 when there is such RLC-PDU. In Step S103, the RLC sublayer of the receiving side apparatus reactivates the reordering timer.

As shown in FIG. 14, when there is any unreceived RLC-PDU with the sequence number of which is between the lower limit value ("VR(R)") of the receiving side window and the sequence number ("T_SN") of the RLC-PDU having triggered the activation of the reordering timer currently being activated, in Step S301, the RLC sublayer of the receiving side apparatus triggers transmission of a STATUS-PDU (NACK) for the unreceived RLC-PDU. Here, in response to the trigger, the RLC-control-PDU generator unit 19 generates the STATUS-PDU (NACK) at a timing for generating the next STATUS-PDU.

In Step S302, the RLC sublayer of the receiving side apparatus determines whether or not there is any RLC-PDU with a sequence number of which is larger than the aforementioned "T_SN" and which has not been received in correct order of the sequence numbers.

The operation terminates when there is no such RLC-PDU, or returns to Step S103 shown in FIG. 12 when there is such RLC-PDU. In Step S103, the RLC sublayer of the receiving side apparatus activates the reordering timer, triggered by such RLC-PDU.

(Advantageous Effects of Mobile Communication System According to First Embodiment of Present Invention)

In the mobile communication system according to the first embodiment of the present invention, a reordering timer is once stopped when a value of the sequence number of an RLC-PDU having triggered activation of the reordering timer falls out of the range of a receiving side window as a result of updating the upper limit value and the lower limit value of the receiving side window. Then, triggered by the receipt of the RLC-PDU having triggered the update of the receiving side window, the reordering timer is reactivated if there is any unreceived RLC-PDU with a sequence number of which is a value within the receiving side window. This can avoid waiting fruitlessly for receipt of an RLC-PDU having a sequence number outside the range of the receiving side window, and performing fruitless retransmission control processing on such RLC-PDU.

(Configuration of a Mobile Communication System According to a Second Embodiment of the Present Invention)

Figure 15:
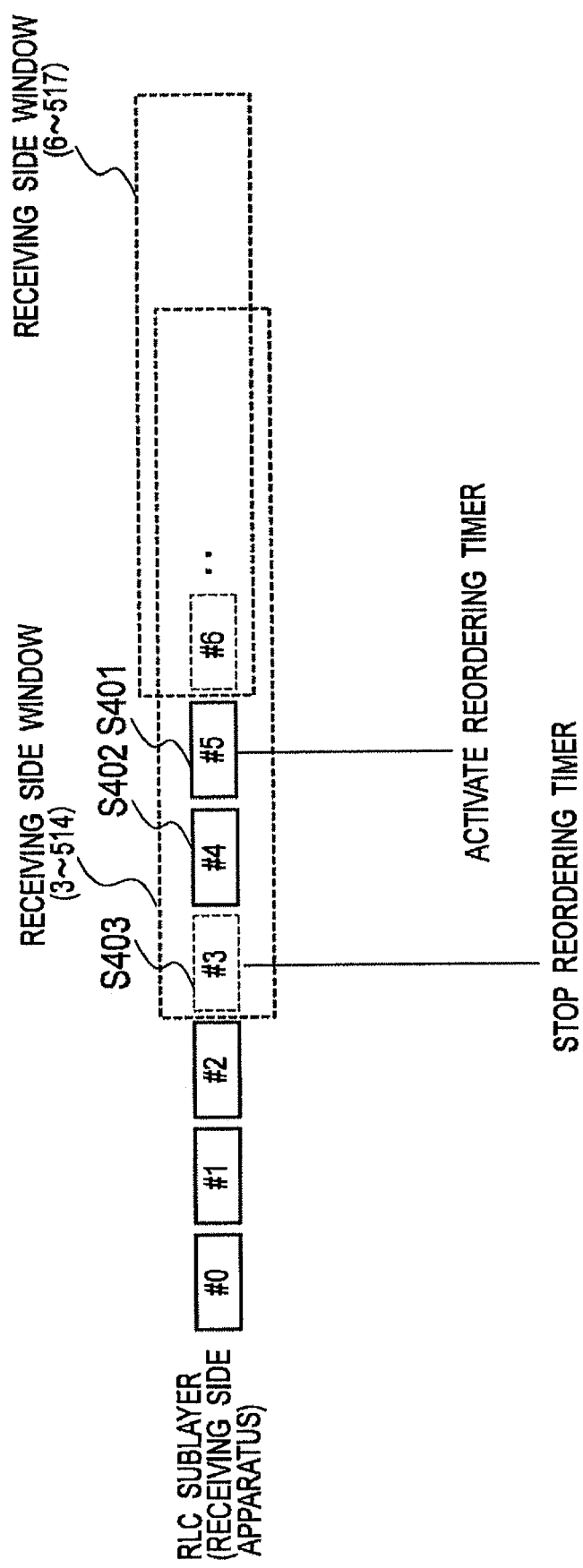
FIG. 15 is a diagram illustrating an operation of the RLC sublayer of a mobile station and a radio base station according to a second embodiment of the present invention.

With reference to FIG. 15, a configuration of a mobile communication system according to a second embodiment of the present invention will be described. Specifically, a description will be given of an operation in which the RLC sublayer of a receiving side apparatus stops a reordering timer when updating a receiving side window.

First, in the RLC sublayer of the receiving side apparatus, the reordering buffer 32 manages a receiving side window defining the upper limit value and the lower limit value of a sequence number of a receivable packet. For example, in the example in FIG. 15, when having received an RLC-PDU of sequence number #2, the reordering buffer 32 updates the upper limit value and the lower limit value of the receiving side window to the upper limit value "VR(MR)"=514 and to the lower limit value "VR(R)"=3. Note that, in the example in FIG. 15, the "Window Size" of the receiving side window is "512".

Then in the example in FIG. 15, the reordering buffer 32 activates a reordering timer when having received an RLC-PDU with sequence number #5 (first packet) before receiving an RLC-PDU with sequence number #3 or #4 (an unreceived packet with a sequence number smaller than the sequence number of the first packet).

Further, when having not received the RLC-PDU of sequence number #3 or #4 (unreceived packet) in the receiving side window by the time of expiration of the reordering timer activated in response to the receipt of the RLC-PDU of sequence number #5 (first packet), the reordering buffer 32 instructs the RLC-control-PDU generator unit 19 to trigger transmission of a retransmission request for the RLC-PDU with sequence number #3 or #4 (unreceived packet).

On the other hand, when having received the RLC-PDU with sequence number #3 (second packet) (S403) after receiving the RLC-PDU of sequence number #4 (unreceived packet) (S402), the reordering buffer 32 is configured to change the upper limit value and the lower limit value of the receiving side window to the upper limit value "VR(MR)"=517 and to the lower limit value "VR(R)"=6 in accordance with the sequence number #5 of the RLC-PDU with sequence number #5 (first packet) (since the RLC-PDU received has the sequence number #3 being the lower limit value of the receiving side window, the lower limit value of the receiving side window is updated to a sequence number (sequence number #6) which is the smallest among unreceived RLC-PDUs. Further, the upper limit value of the receiving side window is updated accordingly.). In addition, also when having received the RLC-PDU of sequence number #4 (second packet) after receiving the RLC-PDU of sequence number #3 (unreceived packet), the reordering buffer 32 is configured to change the upper limit value and the lower limit value of the receiving side window to the upper limit value "VR(MR)"=517 and to the lower limit value "VR (R)"=6.

Here, the reordering buffer 32 is configured to stop the reordering timer activated in response to the receipt of the RLC-PDU of sequence number #5, when a value of the sequence number #5 (first packet) falls out of the range of the receiving side window as a result of updating the upper limit value and the lower limit value in accordance with the receipt of the RLC-PDU of sequence #3 (second packet) corresponding to the lower limit value of the receiving side window.

As described, the receiving side apparatus according to the present invention can be applied to a case where the upper limit value and the lower limit value of a receiving side window are updated in accordance with receipt of the RLC-PDU of sequence number #3 (second packet) after receiving the RLC-PDU of sequence number #5 (first packet).

(Advantageous Effects of Mobile Communication System of Second Embodiment of Present Invention)

In the mobile communication system according to the second embodiment of the present invention, a reordering timer is stopped when a value of the sequence number of an RLC-PDU having triggered activation of the reordering timer falls out of the range of a receiving side window as a result of updating the upper limit value and the lower limit value of the receiving side window. This can avoid performing fruitless retransmission control processing on an RLC-PDU having a sequence number outside the range of the receiving side window.

(Configuration of Mobile Communication System According to Third Embodiment of Present Invention)

Figure 16:
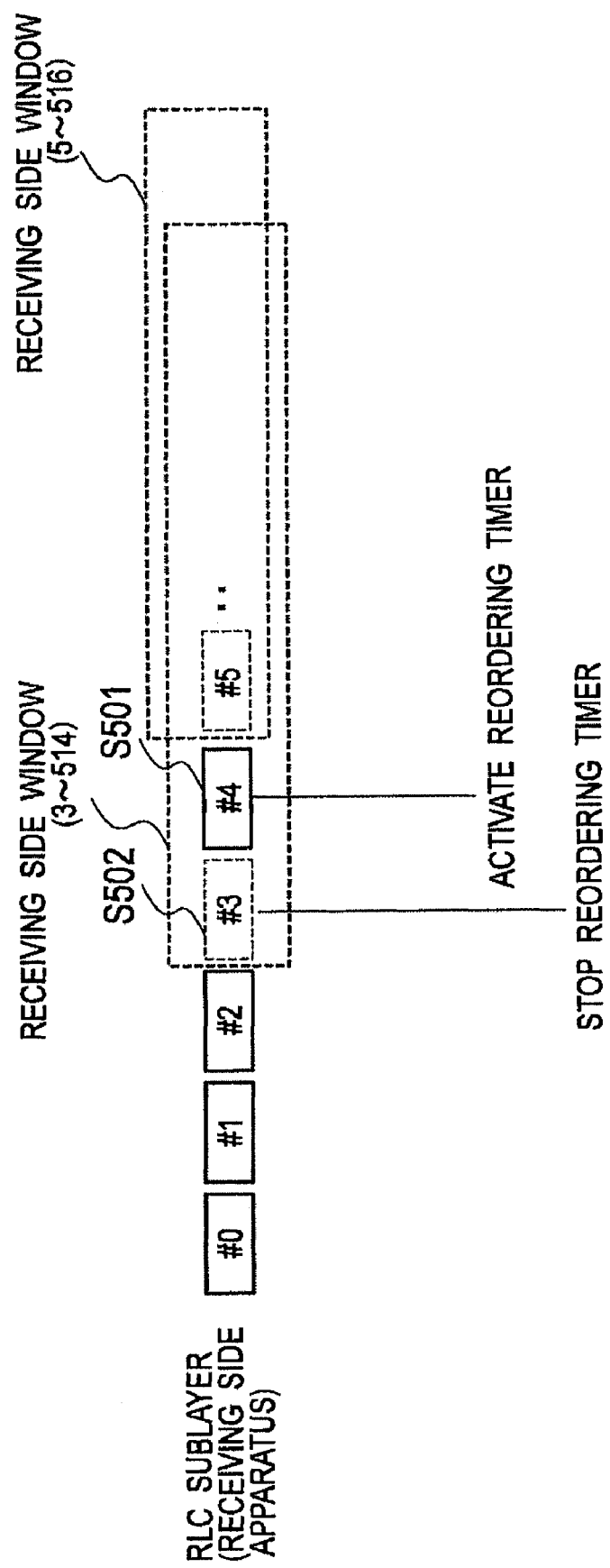
FIG. 16 is a diagram illustrating an operation of the RLC sublayer of a mobile station and a radio base station according to a third embodiment of the present invention.

With reference to FIG. 16, a configuration of a mobile communication system according to a third embodiment of the present invention will be described. Specifically, a description will be given of an operation in which the RLC sublayer of a receiving side apparatus stops a reordering timer when updating a receiving side window.

First, in the RLC sublayer of the receiving side apparatus, the reordering buffer 32 manages a receiving side window defining the upper limit value and the lower limit value of a sequence number of a receivable packet. For example, in the example in FIG. 16, when having received an RLC-PDU with sequence number #2, the reordering buffer 32 updates the upper limit value and the lower limit value of the receiving side window to the upper limit value "VR(MR)"=514 and to the lower limit value "VR(R)"=3.

Then in the example in FIG. 16, the reordering buffer 32 activates a reordering timer when having received an RLC-PDU with sequence number #4 (first packet) before receiving an RLC-PDU with sequence number #3 (an unreceived packet with a sequence number smaller than the sequence number of the first packet) (S501 shown in FIG. 16).

Further, when having not received the RLC-PDU with sequence number #3 (unreceived packet) in the receiving side window by the time of expiration of the reordering timer activated in response to the receipt of the RLC-PDU with sequence number #4 (first packet), the reordering buffer 32 instructs the RLC-control-PDU generator unit 19 to trigger transmission of a retransmission request for the RLC-PDU with sequence number #3 (unreceived packet).

On the other hand, when having received the RLC-PDU with sequence number #3 (second packet) (S502) after receiving the RLC-PDU with sequence number #4 (first packet), the reordering buffer 32 is configured to change the upper limit value and the lower limit value of the receiving side window to the upper limit value "VR (MR)"=516 and to the lower limit value "VR(R)"=5 (since the RLC-PDU received has the sequence number #3 being the lower limit value of the receiving side window, the lower limit value of the receiving side window is updated to a sequence number (sequence number #5) which is the smallest among unreceived RLC-PDUs. Further, the upper limit value of the receiving side window is updated accordingly.).

Here, the reordering buffer 32 is configured to stop the reordering timer activated in response to the receipt of the RLC-PDU of sequence number #4, when a value of the sequence number #4 (first packet) falls out of the range of the receiving side window as a result of updating the upper limit value and the lower limit value in accordance with receipt of the RLC-PDU with sequence #3 (second packet) corresponding to the lower limit value of the receiving side window.

As described, the receiving side apparatus according to the present invention can be applied to a case where the upper limit value and the lower limit value of a receiving side window are changed in accordance with receipt of the RLC-PDU with sequence number #3 (an unreceived packet, a second packet) after receiving the RLC-PDU with sequence number #4 (first packet).

(Advantageous Effects of Mobile Communication System of Third Embodiment of Present Invention)

In the mobile communication system according to the third embodiment of the present invention, a reordering timer is stopped when a value of the sequence number of an RLC-PDU having triggered activation of the reordering timer falls out of the range of a receiving side window as a result of updating the upper limit value and the lower limit value of the receiving side window. This can avoid performing fruitless retransmission control processing on an RLC-PDU having a sequence number outside the range of the receiving side window.

The present invention has been described above using the embodiments given above. However, it is apparent to those skilled in the art that the present invention is not limited to the embodiments described herein. The present invention may be carried out as modified or corrected forms without departing from the spirit and scope of the present invention defined by the appended claims. Therefore, the description given herein is for illustrative purposes only and is not intended to limit the present invention whatsoever.

Note that the entire content of Japanese Patent Application No. 2007-077978 (filed on Mar. 23, 2007) is incorporated herein by reference.

INDUSTRIAL APPLICABILITY

As described above, the present invention can provide a retransmission-request transmitting method and a receiving side apparatus by which waiting fruitlessly for receipt of an RLC-PDU and performing fruitless retransmission control processing on such RLC-PDU can be avoided in accordance with the update status of the upper limit value and the lower limit value of the receiving side window. The retransmission-request transmitting method and the receiving side apparatus are therefore useful in radio communications such as mobile communications.

The invention claimed is:

1. A retransmission-request transmitting method in which a receiving side apparatus triggers transmission of a retransmission request for a packet from a transmitting side apparatus, the receiving side apparatus managing a receiving side window defining an upper limit value and a lower limit value of a sequence number of a receivable packet, the retransmission-request transmitting method comprising the steps of:
   activating, at the receiving side apparatus, a reordering timer, when receiving a first packet before receiving an unreceived packet with a sequence number within the receiving side window and smaller than a sequence number of the first packet; and
   triggering, at the receiving side apparatus, transmission of a retransmission request for the unreceived packet, when having not received the unreceived packet by the time of expiration of the reordering timer activated in response to the receipt of the first packet; wherein
   the receiving side apparatus stops the reordering timer activated in response to the receipt of the first packet, when a value of the sequence number of the first packet falls out of a range of the receiving side window as a result of changing the upper limit value and the lower limit value in accordance with a sequence number of a second packet received from the transmitting side apparatus.

2. The retransmission-request transmitting method according to claim 1,
   wherein the receiving side apparatus reactivates the reordering timer, when the reordering timer activated in response to the receipt of the first packet has been stopped as a result of changing the upper limit value and the lower limit value in accordance with the sequence number of the second packet received from the transmitting side apparatus; and when there is an unreceived packet with a sequence number having a value within the receiving side window.

3. The retransmission-request transmitting method according to claim 2,
   wherein the receiving side apparatus triggers transmission of a retransmission request for the unreceived packet, when having not received an unreceived packet with a sequence number smaller than the sequence number of the second packet by the time of expiration of the reordering timer activated in response to receipt of the second packet.

4. A receiving side apparatus configured to trigger transmission of a retransmission request for a packet from a transmitting side apparatus, the receiving side apparatus comprising:
   a receiving side window managed by a reordering buffer, the receiving side window defining an upper limit value and a lower limit value of a sequence number of a receivable packet;
   a reordering timer activated by the reordering buffer when having received a first packet before receiving an unreceived packet with a sequence number smaller than a sequence number of the first packet in the receiving side window;
   a generator unit that is triggered by the reordering buffer to transmit a retransmission request for the unreceived packet when having not received the unreceived packet by the time of expiration of the reordering timer activated in response to receipt of the first packet; and
   wherein the reordering buffer is configured to stop the reordering timer activated in response to the receipt of the first packet, when a value of the sequence number of the first packet falls out of a range of the receiving side window as a result of updating the upper limit value and the lower limit value in accordance with a sequence number of a second packet received from the transmitting side apparatus.

5. The receiving side apparatus according to claim 4,
   wherein the receiving side apparatus is configured to reactivate the reordering timer, when the reordering timer activated in response to the receipt of the first packet has been stopped as a result of changing the upper limit value and the lower limit value in accordance with the sequence number of the second packet received from the transmitting side apparatus; and when there is an unreceived packet with a sequence number having a value within the receiving side window.

6. The receiving side apparatus according to claim 5,
   wherein the receiving side apparatus is configured to trigger transmission of a retransmission request for the unreceived packet, when an unreceived packet with a sequence number smaller than the sequence number of the second packet has not been received by the time of expiration of the reordering timer activated in response to receipt of the second packet.

* * * * *